United States Patent
Harmon et al.

(10) Patent No.: US 11,093,777 B2
(45) Date of Patent: Aug. 17, 2021

(54) OPTICAL CHARACTER RECOGNITION (OCR) AND CODED DATA FOR LEGACY INSTRUMENT DATA TRANSFER

(71) Applicant: Hach Company, Loveland, CO (US)

(72) Inventors: Brian Alan Harmon, Loveland, CO (US); Theo Grover Tillson Barker, Loveland, CO (US)

(73) Assignee: HACH COMPANY, Loveland, CO (US)

(*) Notice: Subject to any disclaimer, the term of this patent is extended or adjusted under 35 U.S.C. 154(b) by 618 days.

(21) Appl. No.: 14/923,201

(22) Filed: Oct. 26, 2015

(65) Prior Publication Data

US 2017/0116493 A1    Apr. 27, 2017

(51) Int. Cl.
G06K 9/00    (2006.01)
G06K 9/18    (2006.01)

(52) U.S. Cl.
CPC .......... *G06K 9/18* (2013.01); *G06K 9/00979* (2013.01); *G06K 2209/03* (2013.01)

(58) Field of Classification Search
CPC .... G01K 11/06; G01N 25/04; A61B 2562/08; A61B 5/02055; A61B 5/022;
(Continued)

(56) References Cited

U.S. PATENT DOCUMENTS 6,909,793 B1    6/2005  Mori et al.
8,791,835 B2    7/2014  Zhang
(Continued)

FOREIGN PATENT DOCUMENTS

WO    WO2001094937 A1    12/2001
WO    WO2013136295 A1    9/2013
WO    WO2014158817 A1    10/2014

OTHER PUBLICATIONS

Korean Intellectual Property Office, International Search Report, dated Dec. 19, 2016, 1 page, Korean Intellectual Property Office, Republic of Korea.
(Continued)

*Primary Examiner* — Manuchehr Rahmjoo
(74) *Attorney, Agent, or Firm* — Ference & Associates LLC

(57) ABSTRACT

One embodiment provides a method for capturing information from a measuring instrument, including: capturing, using an image capture device, an image of information displayed on the measuring instrument; analyzing, using a processor, the information; detecting, based on the analyzing, a plurality of elements within the information; wherein the plurality of elements comprise: identification data associated with the measuring instrument and measurement data, the identification data being coded within a tag element; wherein the tag element is at least one of a quick response code, a two dimensional barcode, a barcode, and a service identification tag; the identification data comprising data relating to at least one of: unit type, notation type, device type, device identification, device location, device vendor, device manufacturer, and current user; extracting, using a processor, the plurality of elements from the image; and storing, in a storage device, the plurality of elements in a formatted file. Other aspects are described and claimed.

20 Claims, 3 Drawing Sheets

(58) Field of Classification Search
CPC ....... A61B 5/0402; A61B 5/0537; A61B 5/11; A61B 5/14532
USPC ........................................................ 382/181
See application file for complete search history.

(56) References Cited

U.S. PATENT DOCUMENTS

| | | |
|---|---|---|
| 2008/0052012 A1 | 2/2008 | Howell et al. |
| 2012/0131416 A1 | 5/2012 | Dugan et al. |
| 2012/0190386 A1* | 7/2012 | Anderson .............. G01C 15/04 455/456.3 |
| 2013/0026220 A1 | 1/2013 | Whelihan |
| 2013/0029683 A1 | 1/2013 | Kim et al. |
| 2013/0032634 A1 | 2/2013 | McKirdy |
| 2013/0176141 A1 | 7/2013 | LaFrance et al. |
| 2014/0110472 A1 | 4/2014 | Seekola |
| 2014/0263618 A1* | 9/2014 | McCarthy .............. G06Q 40/02 235/379 |
| 2015/0227992 A1* | 8/2015 | Wong ..................... G06Q 30/04 705/34 |

OTHER PUBLICATIONS

Paganini, Pierluigi, "Cardless ATMs will improve security of cash withdrawal", Security Affairs, Mar. 17, 2015, 5 pages, Copy available at: http://securityaffairs.co/wordpress/34962/security/cardless-atms-mobile.html, Accessed on Mar. 27, 2015.

* cited by examiner

OPTICAL CHARACTER RECOGNITION (OCR) AND CODED DATA FOR LEGACY INSTRUMENT DATA TRANSFER

BACKGROUND

Some existing instrumentation does not have an electronic communication capability. Thus, such instruments cannot automatically transfer results, e.g., transmit measurements or readings to another device. Other instrumentation has an electronic communication capability, but may be difficult to utilize for other reasons. For example, some instrumentation is difficult or impossible to take into the field. This has led to a situation where results (measurements, readings, etc.) are written down manually and then transferred into another electronic device, e.g., computer. This in turn leads to transcription errors.

BRIEF SUMMARY

In summary, an embodiment provides a method for capturing information from a measuring instrument, comprising: capturing, using an image capture device, an image of information displayed on the measuring instrument; analyzing, using a processor, the information; detecting, based on the analyzing, a plurality of elements within the information; wherein the plurality of elements comprise: identification data associated with the measuring instrument and measurement data, the identification data being coded within a tag element; wherein the tag element is at least one of a quick response code, a two dimensional barcode, a barcode, and a service identification tag; the identification data comprising data relating to at least one of: unit type, notation type, device type, device identification, device location, device vendor, device manufacturer, and current user; extracting, using a processor, the plurality of elements from the image; and storing, in a storage device, the plurality of elements in a formatted file.

Additionally, an embodiment provides an information handling device for capturing information from a measuring instrument, comprising: a processor; an image capture device; a memory device that stores instructions executable by the processor to: capture, using the image capture device, an image of information displayed on the measuring instrument; analyze, using the processor, the information; detect, based on the analyzing, a plurality of elements within the information; wherein the plurality of elements comprise: identification data associated with the measuring instrument and measurement data, the identification data being coded within a tag element; wherein the tag element is at least one of a quick response code, a two dimensional barcode, a barcode, and a service identification tag; the identification data comprising data relating to at least one of: unit type, notation type, device type, device identification, device location, device vendor, device manufacturer, and current user; extracting, using the processor, the plurality of elements from the image; and storing, in a storage device, the plurality of elements in a formatted file.

Further, an embodiment provides a product for capturing analysis information from a measuring instrument, comprising: a storage device having code stored therewith, the code being executable by a processor and comprising: code that captures, using an image capture device, an image of information displayed on the measuring instrument; code that analyzes the information; code that detects, based on the analyzing, a plurality of elements within the information; wherein the plurality of elements comprise: identification data associated with the measuring instrument and measurement data, the identification data being coded within a tag element; wherein the tag element is at least one of a quick response code, a two dimensional barcode, a barcode, and a service identification tag; the identification data comprising data relating to at least one of: unit type, notation type, device type, device identification, device location, device vendor, device manufacturer, and current user; code that extracts the plurality of elements from the image; and code that stores, in a storage device, the plurality of elements in a formatted file.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
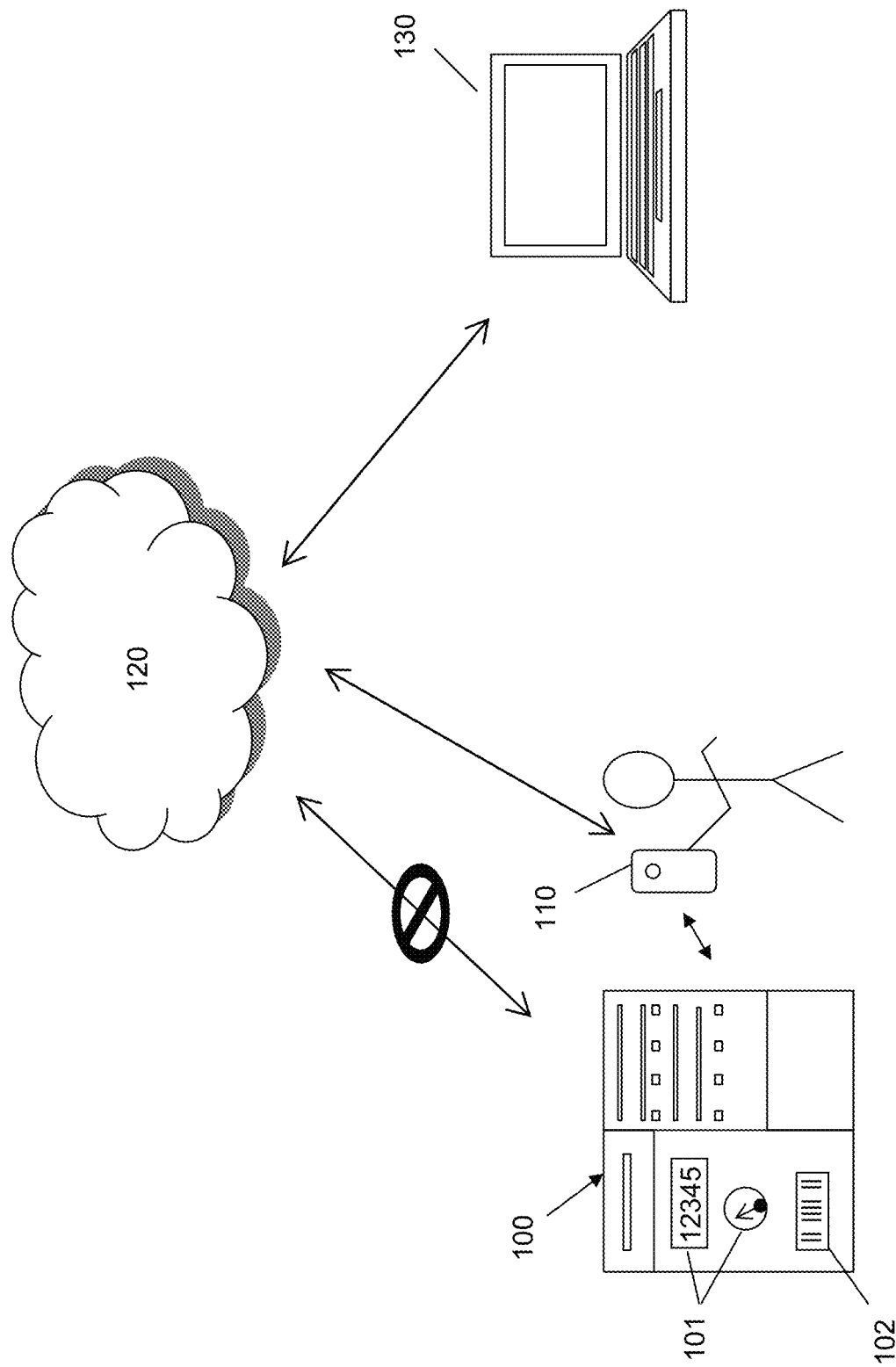
FIG. 1 illustrates an overview of an example system for legacy instrument data transfer.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

In an embodiment, an electronic device is operated to capture an image of information displayed on an instrument. This information includes, by way of example, digital or analog result data that is displayed by an instrument. Because the instrument may be a legacy instrument, e.g., lacking an electronic communication capability, the instrument will not be able to transmit the results to another location electronically. This may lead to transcription errors whereby a user or operator records inaccurate results data. Moreover, this adds to the time and cost of transferring the results data to other locations, even if recorded accurately.

An embodiment may include an electronic device having a camera to capture an image of the results, e.g., as displayed on an instrument display panel. Additionally, in an embodiment, the instrument may include a bar code (or like coded data, e.g., QR code, 3D bar code, etc.). The bar code may be displayed by the instrument, e.g., on an instrument display panel, or the bar code may be provided via a label attached to the instrument. In any case, the bar code (or like coded data) may be used to indicate certain information, e.g., bar code metadata such as instrument serial number, instrument type, additional data regarding the results data (e.g., calibration information, other quality assurance data, etc.). Additional information may likewise be included. For example, in a location where conventional location services (e.g., GPS location services) are unavailable or unreliable (e.g., indoors, outdoor areas with overhead obstructions, etc.), the bar code or like coded data may include location information.

The image that is captured may be processed to identify the results. By way of example, an image of an instrument results display may be processed, for example, using an optical character recognition (OCR) or like processing to identify one or more of numbers, letters, symbols, etc., in the image data. For example, OCR may be applied to the image data in order to retrieve measurement results from an instrument having an LCD display or analog dial, etc. Thus, image processing techniques may be applied to the results displayed on a non-graphics instrument display.

Combined information from bar code data and/or OCR processing may be used to enhance the accuracy of the image processing and to create a data record in electronic format. The image processing may be improved by the bar code by informing the image processing as to what data is expected, e.g., based on instrument identification. Once the electronic record is formed, the result data record is contained in the electronic device and thus may be transmitted to other devices, e.g., over a network connection such as the Internet. The electronic device may also attach related data (e.g., user or operator, time of day, date, an image file, etc.) to the data record.

The illustrated example embodiments will be best understood by reference to the figures. The following description is intended only by way of example, and simply illustrates certain example embodiments.

FIG. 1 provides a general overview of an embodiment. As shown, an instrument 100 (e.g., a legacy instrument) may include one or more result displays 101. By way of example, the result displays 101 may include an alphanumeric LCD type display and/or may include an analog display. In the example illustrated, if either of the result displays 101 have current readings that a user wishes to transfer, e.g., to another device, the user must record the results manually, as the instrument 100 does not include an electronic communication capability.

According to an embodiment, the user may operate an electronic device 110, e.g., a smart phone, tablet computing device, etc., to capture an image of either or both of the result displays 101. A user may take picture of the result displays 101 such that an image processing application, as further described herein, may analyze and extract the result values from the image and place them into an electronic record. This permits the result data of the result displays 101 to be stored in a transmissible format.

The image processing may take place locally at device 110 and/or may take place at a remote device, e.g., cloud service device 120. After the image is captured and analyzed, the extracted results data may be transmitted to other devices, e.g., from device 110 to device 120 and/or device 130. This facilitates quick and accurate recordation of data provided by result displays 101, even if the instrument 100 is a legacy instrument incapable of transmitting its own results data.

An embodiment may include providing a bar code 102 (or like coded data) to at the instrument 100. This bar code 102 allows for the inclusion of additional data that may be of use in terms of image processing, results processing, or both. By way of example, bar code 102 may include an instrument ID, which informs device 110 of the instrument type, model, etc., such that image processing (e.g., identification of relevant results data in a captured image) is facilitated. Moreover, bar code 102 may include location information, time information, or other ancillary or metadata of interest, e.g., calibration history of the instrument 100.

As may be appreciated, bar code 102 (or like coded data) may be captured in an image and identified/read. By way of example, the bar code 102 may be captured in the same image as the image containing the result displays 101. In contrast, a separate image of the bar code 102 may be obtained and related to an image of the result displays 101. If two (or more) images are captured, these may be associated to one another, for example via metadata or forming of a composite image. Likewise, device 110 may include a separate bar code reader (or like reader if bar code 102 is another type of coded information, e.g., RFID, near field data, etc.).

Figure 2:
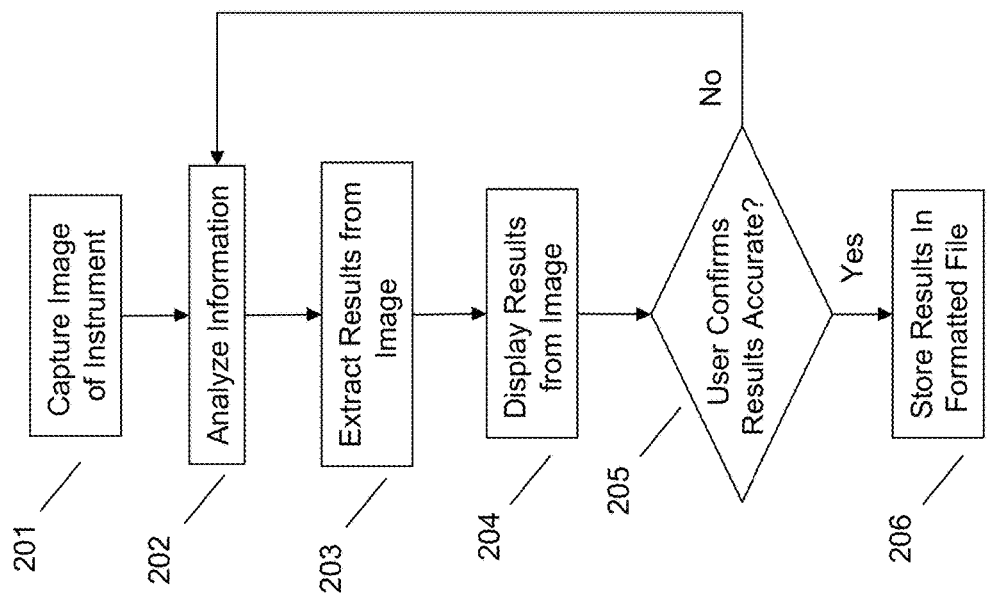
FIG. 2 illustrates an example method of legacy instrument data transfer.

Turning now to FIG. 2, an example method of result data transfer according to an embodiment is illustrated. In an example method, an image capture device (e.g., a camera) is operated at 201 to capture an image of information displayed on a measuring instrument, e.g., instrument 100 of FIG. 1. The image is then analyzed at 202, e.g., using a processor of a local device such as device 110 of FIG. 1 and/or a processor of a remote device, e.g., device 120 or 130 of FIG. 1, to detect a plurality of elements within the information. By way of example, the image information may be analyzed at 202 to determine if the image contains alphanumeric results data from the instrument in question. As described herein, the instrument in question may be identified by a bar code or like coded data.

If the analysis of the image at 202 indicates that results data is included in the image, an embodiment extracts the results from the image at 203. Thus, the user may be apprised of the results of the image analysis at 204, such as by way of providing a display of the extracted results on a display of the local device, e.g., device 110 of FIG. 1. A user may be asked to confirm the results of the image analysis, e.g., as illustrated at 205. If the results are accurate, i.e., the results displayed at 204 match the results displayed by the instrument, the results may be stored in electronic form at 206, e.g., stored locally and/or transmitted to a remote device, e.g., device 120 and/or 130 of FIG. 1.

An embodiment therefore includes an application to capture images of instruments such that the results displayed by the instruments may be conveniently converted into electronic format. This permits easier transfer of the result data to other devices and reduces the amount of error in data recordation, e.g., due to transcription errors. It will be appreciated by one having ordinary skill in the art that certain of the features of the described example embodiments may be omitted, whereas certain of the features of the example embodiments may also be combined or consolidated without departing from the scope and sprit of the disclosure. By way of example, the application, e.g., running on a device such as a smart phone or tablet computing device, may include menu options for identifying the instrument, in which case the use of a bar code or like coded data to identify the instrument may be unnecessary.

An embodiment may be implemented on a wide variety of devices. Examples of suitable devices may include a smart phone or a tablet computing device having a camera and a network communication capability.

Figure 3:
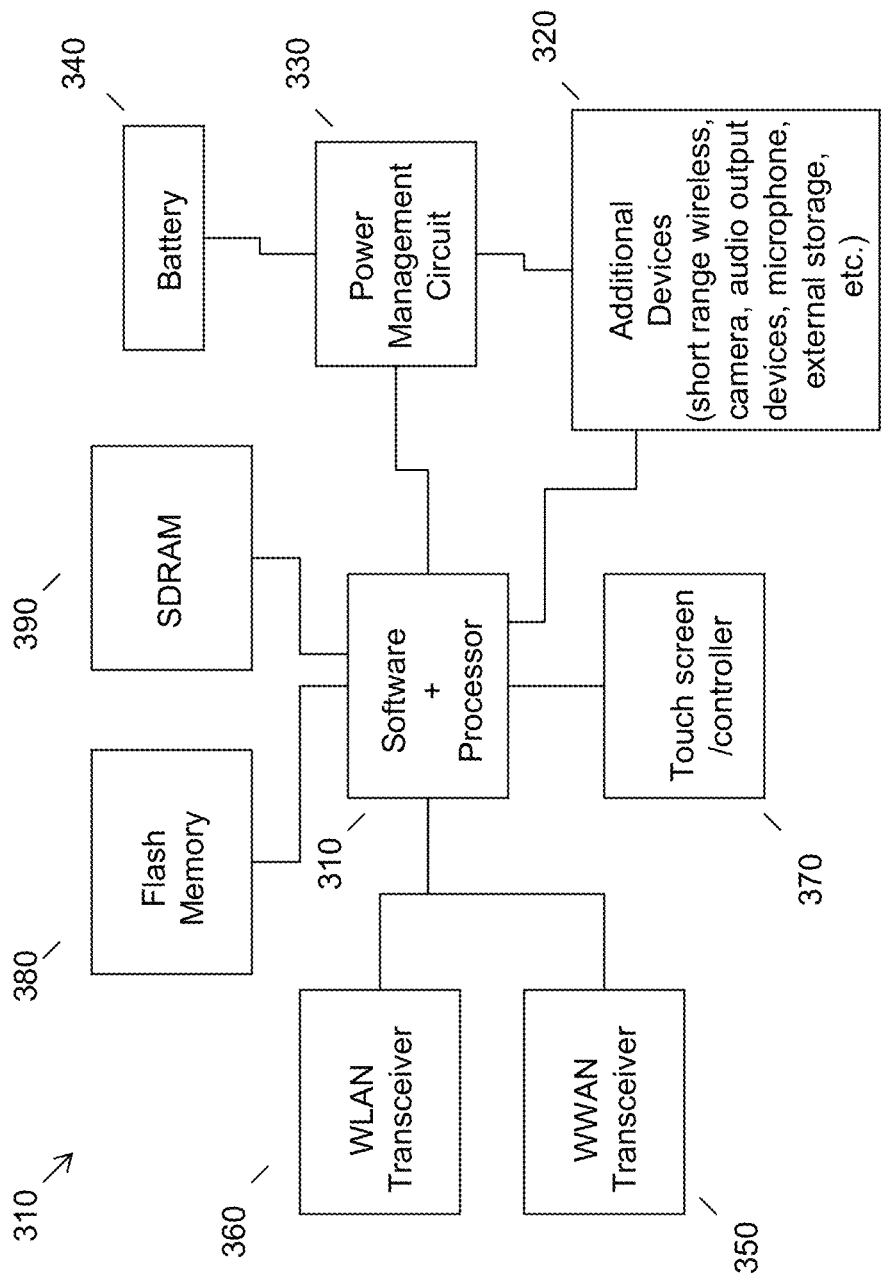
FIG. 3 illustrates an example of computer circuitry.

While various other circuits, circuitry or components may be utilized in such devices, with regard to smart phone and/or tablet circuitry 300, an example illustrated in FIG. 3 includes a system on a chip design found for example in tablet or other mobile computing platforms. Software and processor(s) are combined in a single chip 310. Internal busses and the like depend on different vendors, but essentially all the peripheral devices (320) may attach to a single chip 310. The circuitry 300 combines the processor, memory control, and I/O controller hub all into a single chip 310. Also, systems 300 of this type do not typically use SATA or PCI or LPC. Common interfaces, for example, include SDIO and I2C.

There are power management chip(s) 330, e.g., a battery management unit, BMU, which manage power as supplied, for example, via a rechargeable battery 340, which may be recharged by a connection to a power source (not shown). In at least one design, a single chip, such as 310, is used to supply BIOS like functionality and DRAM memory.

System 300 typically includes one or more of a WWAN transceiver 350 and a WLAN transceiver 360 for connecting to various networks, such as telecommunications networks and wireless Internet devices, e.g., access points. Additionally, devices 320 are commonly included, e.g., an image capture device such as a camera or a bar code reader, as further described herein. System 300 often includes a touch screen 370 for data input and display/rendering. System 300 also typically includes various memory devices, for example flash memory 180 and SDRAM 390.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as a system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. A method for capturing information from a measuring instrument, comprising:
    capturing, using an image capture device separate from a measuring instrument, an image of information displayed on the measuring instrument, wherein the measuring instrument lacks electronic communication capability and wherein the information comprises measurement result data displayed by the measuring instrument after an analysis is performed by the measuring instrument and at least one tag element having identification data coded with the at least one tag element;
    wherein the tag element is at least one of a quick response code, a two dimensional barcode, a barcode, and a service identification tag and wherein the tag element corresponds to identification data identifying the measuring instrument;
    the identification data comprising data relating to at least one of: unit type, notation type, device type, device identification, device location, device vendor, device manufacturer, and current user;
    analyzing, using a processor, the image using an image analysis technique to identify the information included in the image, wherein the analyzing comprises utilizing the identification data within the tag element to facilitate identification of the measurement result data;
    extracting, using a processor, the information from the image; and
    storing, in a storage device, the information in a formatted file, wherein the formatted file comprises the measurement results correlated with the identification data of the measuring instrument.

2. The method of claim 1, wherein the measurement data is coded within the tag element.

3. The method of claim 2, wherein the measurement data coded within the tag is updated based on at least one of: user input and a predetermined interval.

4. The method of claim 1, wherein the measurement data comprises at least one character, wherein the at least one character comprises at least one of: a letter, a number, and a symbol.

5. The method of claim 4, further comprising generating, using optical character recognition, machine text based on the at least one character.

6. The method of claim 1, wherein the storage device comprises a remote storage device.

7. The method of claim 1, further comprising displaying, on a display device, the identification data and the measurement data.

8. The method of claim 1, further comprising responsive to a user input, transferring, using a network connection device, the identification data and the measurement data to a remote storage device.

9. The method of claim 1, further comprising: detecting, using a processor, a location of the image capture device.

10. The method of claim 9, further comprising: transferring, using a network connection device, location data associated with the location of the image capture device.

11. An information handling device for capturing information from a measuring instrument, comprising:
- a processor;
- an image capture device;
- a memory device that stores instructions executable by the processor to:
- capture, using the image capture device separate from a measuring instrument, an image of information displayed on the measuring instrument, wherein the measuring instrument lacks electronic communication capability and wherein the information comprises measurement result data displayed by the measuring instrument after an analysis is performed by the measuring instrument and at least one tag element having identification data coded with the at least one tag element;
- wherein the tag element is at least one of a quick response code, a two dimensional barcode, a barcode, and a service identification tag and wherein the tag element corresponds to identification data identifying the measuring instrument;
- the identification data comprising data relating to at least one of: unit type, notation type, device type, device identification, device location, device vendor, device manufacturer, and current user;
- analyze, using a processor, the image using an image analysis technique to identify the information included in the image, wherein the analyzing comprises utilizing the identification data within the tag element to facilitate identification of the measurement result data;
- extracting, using the processor, the information from the image; and
- storing, in a storage device, the information in a formatted file, wherein the formatted file comprises the measurement results correlated with the identification data of the measuring instrument.

12. The information handling device of claim 11, wherein the measurement data is coded within the tag element.

13. The information handling device of claim 12, wherein the measurement data coded within the tag is updated based on at least one of: user input and a predetermined interval.

14. The information handling device of claim 11, wherein the measurement data comprises at least one character, wherein the at least one character comprises at least one of: a letter, a number, and a symbol.

15. The information handling device of claim 14, wherein the instructions are further executable by the processor to generate, using optical character recognition, machine text based on the at least one character.

16. The information handling device of claim 11, wherein the storage device comprises at a remote storage device.

17. The information handling device of claim 11, wherein the instructions are further executable by the processor to: display, on a display device, the identification data and the measurement data.

18. The information handling device of claim 11, wherein the instructions are further executable by the processor to: responsive to a user input, transfer, using a network connection device, the identification data and the measurement data to a remote storage device.

19. The information handling device of claim 11, further comprising a network connection device, wherein the instructions are further executable by the processor to: transfer, using the network connection device, location data associated with the location of the image capture device.

20. A product for capturing analysis information from a measuring instrument, comprising:
- a computer readable storage memory having code stored therewith, the code being executable by a processor and comprising:
- code that captures, using an image capture device separate from a measuring instrument, an image of information displayed on the measuring instrument, wherein the measuring instrument lacks electronic communication capability and wherein the information comprises measurement result data displayed by the measuring instrument after an analysis is performed by the measuring instrument and at least one tag element having identification data coded with the at least one tag element;
- wherein the tag element is at least one of a quick response code, a two dimensional barcode, a barcode, and a service identification tag and wherein the tag element corresponds to identification data identifying the measuring instrument;
- the identification data comprising data relating to at least one of: unit type, notation type, device type, device identification, device location, device vendor, device manufacturer, and current user;
- code that analyzes, using a processor, the image using an image analysis technique to identify the information included in the image, wherein the analyzing comprises utilizing the identification data within the tag element to facilitate identification of the measurement result data;
- code that extracts the information from the image; and
- code that stores, in a storage device, the information in a formatted file, wherein the formatted file comprises the measurement results correlated with the identification data of the measuring instrument.

* * * * *